United States Patent Office 3,558,564
Patented Jan. 26, 1971

3,558,564
THERMOSETTING COATING COMPOSITION OF AN ORGANIC POLYISOCYANATE AND A POLYMER HAVING PENDANT HYDROXYL CONTAINING ESTER GROUPS
Joseph A. Vasta, Woodbury, N.J., assignor to E. I. du Pont de Nemours and Company, Wilmington, Del., a corporation of Delaware
No Drawing. Filed Mar. 27, 1969, Ser. No. 811,254
Int. Cl. C08g 22/16, 51/22
U.S. Cl. 260—77.5                                          14 Claims

ABSTRACT OF THE DISCLOSURE

A thermosetting coating composition of a urethane polymer that cures into a durable, flexible coating is the subject of this invention; the film-forming constituents of the coating composition are
(1) an organic polyisocyanate, and
(2) a polymer that has a backbone of polymerized ethylenically unsaturated monomers and has attached directly to its backbone ester groups of the following structure

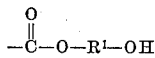

and

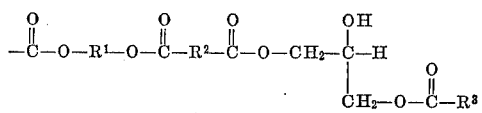

or an isomer thereof, wherein $R^1$, $R^2$ and $R^3$ are hydrocarbon radicals; this novel coating composition is particularly useful as a high quality industrial finish and can be used to paint autos, trucks, aircraft, railway equipment and the like.

BACKGROUND OF THE INVENTION

This invention relates to a novel coating composition of a polyurethane polymer of polyisocyanate and a polymer having pendant hydroxyl containing ester groups.

Polyurethane compositions are known in the art and have been used as coating compositions, adhesives, molded into articles by conventional techniques and made into foamed products. Typical polyurethanes of a hydroxyl containing polymer and a polyisocyanate are shown in O'Brien U.S. Pat. 3,028,367, issued Apr. 3, 1962; Horvath U.S. Pat. 3,284,415, issued Nov. 8, 1966; Mayer et al. U.S. 3,245,941, issued Apr. 12, 1966 and British Pat. 1,100,386, published Jan. 24, 1968. These prior art compositions form useful products but are not economical, rapid cure compositions which give a coating with excellent appearance and adhesion to substrates, toughness and flexibility as is required by industry for coatings on trucks, airplanes, railway equipment and the like.

The novel coating composition has these excellent properties which are provided by the combination of a unique hydroxy containing polymer and an organic polyisocyanate.

SUMMARY OF THE INVENTION

The novel thermosetting coating composition of this invention comprises 5–60% by weight of a polymer blend and a solvent for the polymer blend in which the blend consists essentially of
(I) an organic polyisocyanate, and
(II) A polymer that has a backbone of polymerized ethylenically unsaturated monomers and has ester groups attached directly to its backbone; these ester groups comprise about 10–75% of the total weight of the polymer and consist essentially of ester group (A)

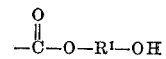

and ester group (B) which is either

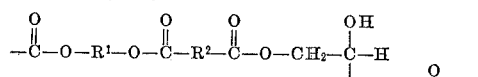

or a mixture of these groups; wherein the molar ratio of ester group (A) to ester group (B) is from about 1:1.5 to 1:2.5; and wherein $R^1$ is a saturated hydrocarbon radical having 2–10 carbon atoms, $R^2$ is selected from the group consisting of alkylene, vinylene, aromatic, carbocyclic and heterocyclic radicals, and $R^3$ is selected from the group consisting of a saturated aliphatic hydrocarbon radical having 1 to 26 carbon atoms and an ethylenically unsaturated aliphatic hydrocarbon radical having 12 to 18 carbon atoms.

DESCRIPTION OF THE INVENTION

The novel coating composition of this invention is prepared by blending an organic polyisocyanate with a polymer having hydroxyl containing ester groups. A reaction catalyst can be blended with the composition to decrease the curing time.

A variety of organic polyisocyanates can be used in the novel coating composition of this invention including aliphatic, cycloaliphatic, alkaryl, aralkyl, heterocyclic and aryl polyisocyanates. Typically useful polyisocyanates are, for exampe, diphenylmethane-4,4'-diisocyanate,
diphenylene-4,4'-diisocyanate,
toluene-2,4-diisocyanate,
toluene-2,6-diisocyanate,
3,3'-dimethoxy-4,4'-diphenylene diisocyanate
methylene-bis-(4-cyclohexyl isocyanate)
tetramethylene diisocyanate,
hexamethylene diisocyanate,
decamethylene diisocyanate,
ethylene diisocyanate,
ethylidene diisocyanate,
propylene-1,2-diisocyanate,
cyclohexylene-1,2-diisocyanate,
m-phenylene diisocyanate, p-phenylene diisocyanate,
1,5-naphthalene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
furfurylidene diisocyanate,
bis-(2-isocyanatoethyl)fumarate,
1,3,5-benzene triisocyanate,
para,para',para"-triphenylmethane triisocyanate,
3,3'-diisocyanatodipropyl ether,
xylylene diisocyanate,
β,β-diphenyl propane-4,4'-diisocyanate.

The product of one of the above isocyanates with a deficient amount of a low molecular weight alcohol, such as, 1,4-butane diol, glycerine, trimethylolpropane, hexane diols and triols may be used as a polyisocyanate in the coating composition of this invention. One preferred polyisocyanate of this type is the reaction product of toluene diisocyanate and trimethylolpropane. These polyisocyanates can be made according to Bunge et al. U.S. 2,855,421, issued Oct. 7, 1958.

Another preferred polyisocyanate is a biuret of the formula:

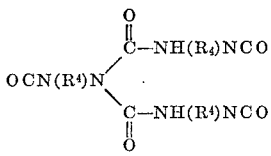

wherein R⁴ is an aliphatic hydrocarbon group having 1-12 carbon atoms. One particularly preferred biuret, since it forms a high quality coating, R⁴ is a saturated straight chain hydrocarbon group having 6 carbon atoms. These biurets can be made according to Mayer et al. U.S. 3,245,941, issued Apr. 12, 1966.

A hydroxy containing polymer is blended with the aforementioned polyisocyanate to form the novel coating composition of this invention. This polymer has pendant hydroxyl containing ester groups which react with the polyisocyanate to form a durable, tough polyurethane coating.

A wide variety of ethylenically unsaturated monomers can be used to prepare the backbone of the hydroxyl containing polymer used to form the coating composition of this invention. Typical monomers that can be used for the backbone are, for example, vinyl chloride, vinylidene chloride, olefins, such as ethylene, propylene and the like; vinyl acetate, conjugated dienes having 4 to 10 carbon atoms, such as butadiene; aromatic hydrocarbons having vinylene groups, such as styrene, alkyl substituted styrene, such as α-methyl styrene; alkyl maleate, such as dibutyl maleate; vinyl pyrrolidone; acrylic esters, such as acrylonitrile; esters of methacrylic acid and acrylic acid, preferably alkyl esters having 1-12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers. Small amounts of ethylenically unsaturated carboxylic acids can also be used in the backbone, such as acrylic acid, methacrylic acid, crotonic acid, itaconic acid, maleic acid and the like.

Particularly useful monomers or combinations of monomers which form the backbone of high quality polymers used to form the coating composition of this invention are, for example, styrene, methyl methacrylate, butyl methacrylate, ethyl acrylate, acrylonitrile and vinyl pyrrolidone.

Ester group (A) of the polymer used in this invention is provided by a hydroxyalkyl substituted vinyl addition monomer, such as hydroxyalkyl methacrylate, a hydroxyalkyl acrylate, a hydroxyalkyl maleate, hydroxyalkyl itaconate, or a mixture of these in which the alkyl group contains 2-10 carbon atoms. The hydroyalkyl monomer is polymerized with the aforementioned backbone monomers.

Preferred hydroxyalkyl monomers used for forming the polymer used in this invention are, for example, hydroxyethyl methacrylate, hydroxypropyl methacrylate, hydroxybutyl methacrylate, hydroxyoctyl methacrylate, hydroxyethyl acrylate, hydroxypropyl acrylate, hydroxbutyl acrylate, hydroxyoctyl acrylate and the like. Preferred are hydroxyalkyl methacrylates or acrylates in which the alkyl groups contain 2-4 carbon atoms.

Ester group (B) is the esterification product of the aforementioned hydroxyalkyl monomers, an anhydride of a dicarboxylic acid and a glycidyl ester. This ester group is polymerized into the polymer backbone through the ethylenic unsaturation of the aforementioned hydroxyalkyl monomers.

The anhydride used for forming ester group (B) has the formula

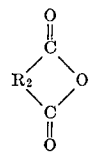

wherein R² is either alkylene, vinylene, aromatic, carbocyclic or a heterocyclic radical. The anhydride reacts with the hydroxyalkyl monomer and also reacts with the glycidyl ester to form group (B).

Anhydrides useful in this invention in which R² is an alkylene group are formed from dicarboxylic acids of the general formula $(CH_2)_n(COOH)_2$ where $n$ is from 2-10. Typical dicarboxylic acids of this group are glutaric, adipic, pimelic, succinic acids and the like. The preferred is an anhydride of succinic acid.

Useful anhydrides in which R² is a vinylene group are derived from dicarboxylic acids of the general formula:

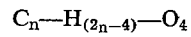

$$C_n-H_{(2n-4)}-O_4$$

wherein $n$ is from 4-10. Typical dicarboxylic acids of this group are maleic and itaconic acids.

Another group of useful anhydrides are derived from dibasic aromatic acids, such as phthalic acid, uvitic acid and cumidinic acid. Often it is desirable to use a halogen substituted anhydride of one of the above aromatic dicarboxylic acids, such as tetrabromophthalic anhydride. Halogen substituted anhydrides in which the halogen substituent is either chlorine, bromine or fluorine are particularly useful in forming fire retardant coating compositions.

Anhydrides in which R² is a carbocyclic radical are useful, such as hexahydrophthalic anhydride, which has the following formula:

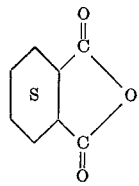

or tetrahydrophthalic anhydride which has the following formula

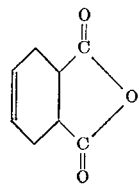

Anhydrides in which $R^2$ is a carbocyclic radical are also useful. One particularly useful compound has the general formula

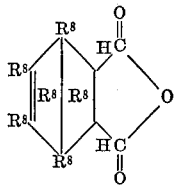

where $R^8$ is either chlorine, bromine or fluorine. The preferred compound is chlorendic anhydride in which $R^8$ is chlorine the chemical name of which is 1,4,5,6,7,7-hexachlorobicyclo[2.2.1] - 5 - heptane - 2,3 - dicarboxylic anhydride.

The glycidyl ester used for forming ester group (B) has the formula

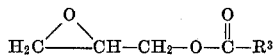

where $R^3$ is a saturated aliphatic hydrocarbon group containing 1–26 carbon atoms, or $R^3$ is an ethylenically unsaturated aliphatic hydrocarbon radical of 12–18 carbon atoms derived from a drying oil fatty acid.

Preferred for use because of the quality of the product obtained are esters where $R^3$ is a tertiary saturated aliphatic hydrocarbon group of the structure

where $R^5$ is $-CH_3$ and $R^6$ and $R^7$ are alkyl groups of 1–12 carbon atoms.

One particularly preferred glycidyl ester of this group because it imparts acid and alkali resistance to the final coating is a mixed glycidyl ester described in U.S. Pat. 3,275,583, issued Sept. 27, 1966, and is manufactured and sold by the Shell Chemical Company as "Cardura" E ester. This glycidyl ester is of a synthetic tertiary carboxylic acid and has the general formula

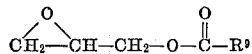

where $R^9$ is a tertiary aliphatic hydrocarbon group of 8–10 carbon atoms.

When a coating composition of this invention is to be an air dried composition, $R^3$ can be an ethylenically unsaturated aliphatic hydrocarbon radical of 12–18 carbon atoms. This glycidyl ester is obtained by esterifying the acid chloride of one of the well known drying oil fatty acids, such as oleic acid, linoleic acid, linolenic acid, oleostearic acid and ricinoleic acid with glycidol. These acids are commonly found in tung oil, linseed oil, dehydrated castor oil and soya oil.

The preferred method for forming the above unsaturated glycidyl esters is to react the sodium salt of the fatty acid with epichlorohydrin. The reaction is as follows:

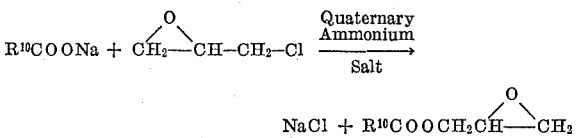

where $R^{10}$ is from one of the aforementioned dying oil fatty acids.

Preferably, the polymer used to form the novel coating composition of this invention has 30 to 60% of its total weight contributed by ester group (A) and (B). Also, these groups are present in the polymer at a molar ratio of ester group (A) to ester group (B) of about 1:1.5 to about 1:2.5, and preferably, in a ratio of about 1:2.

One method for preparing this hydroxyl containing polymer used in this invention is to first form ester group (B) by reacting in about an equal molar ratio the above hydroxyalkyl monomers, the anhydride and the glycidyl ester. This esterification product is then reacted with the backbone monomers and the hydroxyalkyl monomers, which form ester group (A), to from the novel polymer of this invention.

As a typical example, a hydroxyl acrylate, aromatic anhydride and a glycidyl ester are charged into a reaction vessel with a suitable solvent, such as toluene, xylene, acetone or an aromatic solvent and the mixture is heated to its reflux temperature which is about 80 to 200° C., for about 30 minutes to 3 hours. The backbone constituents of the polymer, such as styrene/methyl methacrylate and a hydroxyalkyl acrylate with a suitable polymerization catalyst, such as tertiary butyl peroxide, are then slowly added over a 1–4 hour period. The reaction mixture is heated to its reflux temperature which is about 80 to 200° C. for about 30 minutes to 5 hours, preferably 2–4 hours until a polymer is formed that has the desired molecular weight, which is determined by the relative viscosity as described below. Additional solvent may then be added to dilute the polymer solution.

If the reaction rates of the monomer components used to form the polymer of the invention are suitable, all of the monomers can be charged into a reaction vessel with a suitable solvent and polymerization catalyst and heated to the reflux temperature which is about 80 to 200° C. for 60 minutes to 5 hours.

Another method of preparing the polymer used in this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1–4 hour period into the reaction vessel while maintaining a reflux temperature which is about 80–200° C. After the above ingredients have been added, the reaction mixture is maintained at its reflux temperature for an additional 30 minutes to about 5 hours.

Suitable solvents which are used to prepare the novel polymer used in this invention are toluene, xylene, butylacetate, acetone, methylisobutyl ketone, methylethyl ketone, and other aliphatic cycloaliphatic and aromatic hydrocarbons, esters, ethers, ketones and other solvents which are non-reactive with the monomers used to form the novel polymer of this invention such as are conventionally used in coating compositions.

Suitable polymerization catalysts that are used in the process to prepare the polymer used in this invention are tertiary butyl peroxide, cumene hydroperoxide, azobisisobutyronitrile and the like. To prepare the ester group (B) esterification catalyst, such as quaternary bases or salts as benzyltrimethylammonium hydroxide, benzyltrimethylammonium chloride, octadecyltrimethylammonium chloride, or an amine, such a triethylamine, can be used.

The hydroxyl containing polymer used in this invention preferably has a relative viscosity of 0.9 to 1.4. The "relative viscosity" is the value obtained by dividing the efflux time of a solution of the polymer by the efflux time of the solvent used to form the above polymer solution. The efflux times are measured according to the procedure of ASTM–D–445–46–T, Method B, using as the polymer solution 0.25 gram of the polymer in 50 cubic centimeters of ethylene dichloride as the solvent. The efflux times are measured at 25° C. in a standard apparatus, sold under the designation of a modified Ostwald viscometer.

The hydroxyl containing polymer formed by one of the aforementioned processes is in a solution and is suitable for direct use to form the novel coating composition of this invention. The hydroxyl containing polymer solution is blended with a solution of the polyisocyanate to form the novel coating composition of this invention. The molar ratio of isocyanate to hydroxyl is maintained between about 0.8–1.2 and preferably, maintained at a 1:1 molar ratio with a very slight excess of isocyanate.

In practice, a two component system is used, i.e., the solution of a polyisocyanate is in one package and the solution of the hydroxyl containing polymer is in a separate package. The two solutions are thoroughly mixed before applying the coating composition. This is necessary since in most cases, the "pot life" of the system is relatively short since the reaction between the hydroxyl containing polymer and the polyisocyanate occurs at rapid rate even at room temperatures.

A resulting novel coating composition contains about 10–60% by weight of a polymer blend and a solvent for the resin blend. Additional solvents which are commonly used are high solvency hydrocarbons, alcohols, esters, ketones or ethers and if desired, plasticizers may be added to the novel coating composition.

Preferably, about 0.01–1.0% by weight, based on the weight of the polymer blend of the novel coating composition of this invention, of a reaction catalyst can be added to the coating composition. In a two component system, the catalyst can be added to either the polyisocyanate solution or the solution of the hydroxyl containing polymer. Typically useful catalysts are organo tin catalysts, such as dibutyl tin dilaurate, dibutyl tin di-2-ethylhexoate, stannous octoate, stannous oleate, and the like; zinc naphthenate, vanadium acetyl acetonate, zirconium acetyl acetonate and the like.

Since the "pot life" of the novel coating composition of this invention may be short, pot life extenders can be added such as those shown in the U.S. Pat. 3,314,834, issued Apr. 18, 1967, in particular 2,4-pentanedione. Also, the pot life of the novel coating compositions can be lengthened significantly by using from .01% to about 1%, by weight of the polymer blend, of a tertiary amine catalyst instead of one of those mentioned above. Illustrative of amines which can be used are triethylene diamine, heptamethylisobiguanide, triethylamine, pyridine, dimethylaniline and methyl morpholine. Triethylenediamine and heptamethylisobiguanide are preferred.

A "one-package" coating composition can be prepared using a polyisocyanate whose isocyanate groups have been blocked with a blocking agent such as methyl ethyl ketoxime. This eliminates the need for mixing the prepolymer and isocyanate solutions just before use. When this composition is applied and baked at a temperature of 150–160° C., the blocking agent is released, permitting the isonyanate to react with the hydroxyl containing polymer.

To provide the novel coating composition with other characteristics which may be desirable under some conditions, other compatible polymers may be blended with the novel coating composition, such os polymethyl methacrylate, polystyrene, polyvinylpyrrolidone and the like. For example, 20–40% by weight, based on the weight of the polymer blend of the coating composition of this invention, of polymethyl methacrylate gives the novel coating composition a decreased drying time and an increase in gloss and appearance.

For most uses, the novel coating composition formed from novel polymers of this invention is pigmented. The pigment to binder ratio can vary from above 1–150, depending on the pigment used. By binder, it is meant the film-forming materials in the coating composition. Typical pigments which can be used are metallic oxides, preferably titanium dioxide, zinc oxide, and the like, metal hydroxides, metal flakes, chromates, such as lead chromate, sulfides, sulfates, carbonates, carbon black, silica, talc, china clay, organic dyes and lead, iron blues, organic reds, maroons, and the like, organic dyes and lakes, etc.

The pigments can be introduced into the coating composition by first forming a mill base with the hydroxyl containing polymer by conventional sand-grinding or ball milling techniques, and then blending the mill base with the film-forming polymers as shown in the following examples.

The novel coating compositions of this invention can be applied to a variety of substrates, for example, metal, wood, glass, plastics, such as polypropylene, polystyrene, copolymers of styrene, such as styrene/butadiene/acrylonitrile and the like, by any of the usual application methods, such as spraying, dipping, brushing, flow coating and the like. These coatings can be air dried or baked at a relatively low temperature of about 50–120° C. for about 15 minutes–2 hours or air dried. The resulting coating is about 0.5–5 mils thick, preferably 1–3 mils thick and can be rubbed or polished in accordance with conventional techniques, if desired, to improve smoothness or apparent gloss or both. The novel coating composition of this invention gives a hard, durable, scratch resistant and grease resistant, glossy coating which is suitable for auto bodies, truck bodies, repair of auto bodies and truck bodies, airplanes, railroad equipment, appliances, vending machines, outdoor equipment and the like.

Preferably, the novel coating composition of this invention is applied over a suitably treated or primed metal substrate. For example, steel substrate treated with zinc phophate, can be used. Also, metal substrates coated with typical alkyd primers or epoxy primers pigmented with iron oxide, carbon black, titanium dioxide and the like can be used. Also, the novel composition can be used directly over galvanized steel to form a durable coating.

Ester group (B) of the hydroxyl containing polymer used in the coating composition of this invention can also be described as $$-\overset{O}{\underset{\|}{C}}-O-R^1-O-\overset{O}{\underset{\|}{C}}-R^2-\overset{O}{\underset{\|}{C}}-O\left(Z\right)$$

wherein $R^1$ and $R^2$ are defined above and Z is a monovalent radical of the formula $$\left[-CH_2-\overset{|}{CH}-CH_2-)(OH)O-\overset{O}{\underset{\|}{C}}-R_3\right]$$

and is a hydroxy propyl ester of a saturated aliphatic acid having 2 to 27 carbon atoms or of an ethylenically unsaturated aliphatic carboxylic acid having 13 to 19 carbon atoms.

The following examples illustrate the invention. All quantities are on a weight basis unless otherwise indicated.

EXAMPLE 1

A polymer solution is formed by reacting the following ingredients:

| | Parts by wt. |
|---|---|
| Portion 1 | |
| Xylol | 415.39 |
| Hydroxyethyl acrylate | 218.50 |
| Phthalic anhydride | 269.50 |
| "Cardura" E ester (a mixed ester described in U.S.P. 3,275,583, issued Sept. 27, 1966, and is a glycidyl ester of a synthetic tertiary carboxylic acid of the formula 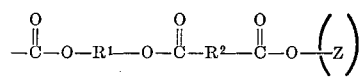 where R is a tertiary aliphatic hydrocarbon group of 8–10 carbon atoms) | 481.25 |
| Portion 2 | |
| Xylol | 621.15 |
| Portion 3 | |
| Styrene | 567.88 |
| Methyl methacrylate | 288.74 |
| Hydroxyethyl acrylate | 99.13 |
| Tertiary butyl peroxide | 17.33 |

Portion 4

| | Parts by wt. |
|---|---|
| Xylol | 363.13 |
| Cellosolve acetate | 158.00 |
| Total | 3500.00 |

Portion 1 is charged into a reactor equipped with a reflux condenser and is heated to a reflux temperature and is held at this temperature for about 1 hour. Portion 2 is then added and the mixture is heated to its reflux temperature. Portion 3 is premixed and slowly added over a 3-hour period while maintaining the reflux condition and then the reaction mixture is held at the reflux temperature for an additional 3 hours. The heat is removed from the reaction vessel and Portion 4 is added.

The resulting polymer solution has a solids content of about 55% and a Gardner Holdt viscosity of about X and the polymer has an acid number less than 10. The polymer is the copolymerization and esterification product of the following reactants:

| | Parts by wt. |
|---|---|
| Styrene | 29.5 |
| Methyl methacrylate | 15.0 |
| Hydroxyethyl acrylate | 16.5 |
| Phthalic anhydride | 14.0 |
| "Cardura" E ester | 25.0 |
| Total | 100.0 |

A paint is formulated by mixing the following ingredients:

Portion 1

| | Parts by wt. |
|---|---|
| Polymer solution of Example 1 (55% polymer solids) | 136 |
| Xylol | 11 |
| Cellosolve acetate | 11 |
| Titanium dioxide pigment (rutile, prepared by the chloride process) | 70 |
| Dibutyl tin dilaurate | 1 |

Portion 2

| | |
|---|---|
| Isocyanate solution—75% solution of hexamethylene diisocyanate biuret in a mixture of organic solvents | 25 |
| Total | 254 |

The above ingredients of Portion 1 are premixed and charged into a conventional sand grinding mill and ground to about 0.5 mil fineness. Portion 2 is then blended with Portion 1.

The resulting paint has a pigment to binder ratio of 70:100, a non-volatile solids content of 60% and a binder composition of 75:25 of polymer to "Desmodur."

The paint is reduced to a hand spray viscosity of 28 seconds No. 2 Zahn Cup using about 10% xylol. This paint is sprayed onto a steel substrate treated with zinc phosphate and baked for 30 minutes at 95° C. The baked paint is flexible, has a high gloss, excellent resistance to solvents after 48 hours, such as methylethyl ketone, and is scratch resistant, e.g., an F pencil will not damage or mar the paint.

A clear coating composition is formulated using the identical ingredients and procedure used to form the above paint, except the titanium dioxide pigment is omitted. The clear coating composition is diluted to a spray viscosity as above and sprayed onto a steel panel treated with zinc phosphate and baked as above. The resulting coating is clear and flexible and has a high gloss and has the same physical properties as the above paint.

Another paint composition is formed by blending the following ingredients:

| | Parts by wt. |
|---|---|
| Paint—prepared above | 254 |
| Polymethyl methacrylate solution (40% polymer solids of polymethyl methacrylate in a solvent of toluene/acetone, 70/30 weight ratio) | 156 |
| Total | 410 |

The resulting paint has a pigment to binder ratio of 45/100, a non-volatile solids content of about 58%, and a binder composition of polymethyl methacrylate/polymer/"Desmodur" of 50/35.5/12.5.

The resulting paint is reduced to a hand spray viscosity as above and sprayed onto a treated steel substrate and air dried in 5-30 minutes to a glossy, flexible film having an excellent appearance.

EXAMPLE 2

Portion 1

| | Parts by wt. |
|---|---|
| Xylol | 1036.70 |
| Phthalic anhydride | 260.05 |

Portion 2

| | |
|---|---|
| Butyl methacrylate | 866.25 |
| Hydroxyethyl acrylate | 317.45 |
| "Cardura" E ester (described in Example 1) | 481.25 |
| Ditertiary butyl peroxide | 17.50 |

Portion 3

| | |
|---|---|
| Xylol | 363.30 |
| Cellosolve acetate | 157.50 |
| Total | 3500.00 |

Portion 1 is charged into a reaction vessel equipped with a reflux condenser and heated to its reflux temperature. Portion 2 is premixed and slowly added over a 2-hour period while maintaining the reflux temperature of the reaction mixture and the reaction mixture is held at its reflux temperature for an additional five hours. Portion 3 is premixed and added to the reaction mixture after the heat has been removed.

The resulting polymer solution has a polymer solids content of 55%, a Gardner Holdt viscosity of about F, and the polymer has an acid number of about 3. The polymer is a copolymerization and esterification product of the following reactants:

| | Parts by wt. |
|---|---|
| Butyl methacrylate | 45.00 |
| Hydroxyethyl acrylate | 16.5 |
| Phthalic anhydride | 13.5 |
| "Cardura" E ester | 25.0 |
| Total | 100.0 |

A paint is formulated by mixing the following ingredients:

Portion 1

| | Parts by wt. |
|---|---|
| Polymer solution of Example 2 (55% polymer solids) | 136 |
| Titanium dioxide pigment (rutile, prepared by the chloride process) | 70 |
| Xylol | 11 |
| Cellosolve acetate | 11 |
| Dibutyl tin dilaurate | 1 |

Portion 2

| | |
|---|---|
| Isocyanate solution (described in Example 1) | 25 |
| Total | 254 |

The above ingredients of Portion 1 are premixed and charged into a conventional sand-grinding mill and ground to about 0.5 mil fineness. Portion 2 is then blended with Portion 1.

The resulting paint has a pigment to binder ratio of 70:100, a non-volatile solids content of 60%, a binder composition of 75:25 of polymer to "Desmodur."

The paint is reduced to a hand spray viscosity of 28 seconds No. 2 Zahn Cup using about 10% xylol. This paint is sprayed onto a steel substrate treated with zinc phosphate and baked for 30 minutes at 95° C. The baked paint is flexible, has high gloss, excellent resistance to solvents after 48 hours, such as methylethyl ketone, and is scratch resistant, e.g., an F pencil will not damage or mar the finish.

EXAMPLE 3

Portion 1

| | Parts by weight |
|---|---|
| Xylol | 1036.70 |
| Tetrahydrophthalic anhydride | 260.05 |

Portion 2

| | |
|---|---|
| Butyl methacrylate | 866.25 |
| Hydroxyethyl acrylate | 317.45 |
| "Cardura" E ester (described in Example 1) | 481.25 |
| Cumene hydroperoxide | 17.50 |

Portion 3

| | |
|---|---|
| Xylol | 363.30 |
| Cellosolve acetate | 157.50 |
| Total | 3500.00 |

Portion 1 is charged into a reaction vessel equipped with a reflux condenser and heated to its reflux temperature. Portion 2 is premixed and slowly added over a 2-hour period while maintaining the reflux temperature of the reaction mixture and the reaction mixture is held at its reflux temperature for an additional five hours. Portion 3 is premixed and added to the reaction mixture after the heat has been removed.

The resulting polymer solution has a polymer solids content of 55%, a Gardner Holdt viscosity of about F., and the polymer has an acid number of about 3. The polymer is a copolymerization and esterification product of the following reactants:

| | Parts by wt. |
|---|---|
| Butyl methacrylate | 45.0 |
| Hydroxyethyl acrylate | 16.5 |
| Tetrahydrophthalic anhydride | 13.5 |
| "Cardura" E ester | 25.0 |
| Total | 100.0 |

A paint composition is formulated by mixing the following ingredients:

Portion 1

| | Parts by wt. |
|---|---|
| Polymer solution of Example 3 (55% solids) | 136 |
| Titanium dioxide pigment (rutile) | 70 |
| Xylol | 11 |
| Cellosolve acetate | 11 |
| Dibutyl tin dilaurate | 1 |

Portion 2

| | |
|---|---|
| Isocyanate solution (described in Example 1) | 25 |
| Total | 254 |

The above ingredients of Portion 1 are premixed and charged into a conventional sand-grinding mill and ground to about 0.5 mil fineness. Portion 2 is then blended with Portion 1.

The resulting paint has a pigment to binder ratio of 70:100, a non-volatile solids content of 60%, a binder composition of 75:25 of polymer to "Desmodur."

The paint is reduced to a hand spray viscosity of 28 seconds No. 2 Zahn Cup using about 10% xylol. This paint is sprayed onto a treated steel substrate, treated with zinc phosphate and baked for 30 minutes at 95° C. The baked paint has excellent resistance to solvents, such as methylethyl ketone, has excellent adhesion to the metal substrate, and is tough and flexible.

EXAMPLE 4

Portion 1

| | Parts by wt. |
|---|---|
| Toluene | 190 |
| Xylol | 762 |
| Phthalic anhydride | 378 |

Portion 2

| | |
|---|---|
| Methyl methacrylate | 360 |
| Hydroxyethyl acrylate | 396 |
| "Cardura" E ester (described in Example 1) | 666 |
| Ditertiary butyl peroxide | 18 |

Portion 3

| | |
|---|---|
| Cellosolve acetate | 230 |
| Total | 3000 |

Portion 1 is charged into a reaction vessel equipped with a reflux condenser and heated to its reflux temperature. Portion 2 is premixed and slowly added over a 2-hour period while maintaining the reflux temperature of the reaction mixture and the reaction mixture is held at its reflux temperature for an additional five hours. Portion 3 is premixed and added to the reaction mixture after the heat has been removed.

The resulting polymer solution has a polymer solids content of 60.25%, a Gardner Holdt viscosity of Y, and the polymer has an acid number of 6.2. The polymer is a copolymerizable and esterification product of the following reactants:

| | Parts by wt. |
|---|---|
| Methyl methacrylate | 20 |
| Hydroxyethyl acrylate | 22 |
| Phthalic anhydride | 21 |
| "Cardura" E ester | 37 |
| Total | 100 |

A paint composition is formulated by mixing the following ingredients:

Portion 1

| | Parts by wt. |
|---|---|
| Polymer solution of Example 4 (60.25% solids) | 136 |
| Titanium dioxide pigment (rutile) | 70 |
| Xylol | 11 |
| Cellosolve acetate | 11 |
| Zinc octoate | 1 |

Portion 2

| | |
|---|---|
| Methylene bis-(4-cyclohexyl isocyanate) | 19 |
| 2,4-pentanedione | 31 |
| Total | 279 |

The above ingredients of Portion 1 are premixed and charged into a conventional sand-grinding mill and ground to about a 0.5 mil fineness. Portion 2 is then blended with Portion 1.

The resulting paint has a pigment to binder ratio of 70:100, a non-volatile solids content of 60%. A binder composition of 75:25 of polymer: "Hylene" W.

The paint is reduced to a hand spray viscosity of 28 seconds No. 2 Zahn cup using about 10% xylol. This paint is sprayed onto a steel substrate treated with zinc phosphate and baked for 30 minutes at 95° C. The baked paint has excellent resistance to solvents, such as methylethyl ketone, is scratch resistant, e.g., an F pencil will not damage or mar the finish and is flexible.

EXAMPLE 5

A paint composition is formulated as in Example 3 using the identical ingredients, except a 75% solution of methylene bis-(4-phenyl isocyanate) was substituted for "Desmodur" solution. The resulting paint composition has the same pigment to binder ratio, the same solids content as in Example 3, and a binder composition of 75:25 of polymer to methylene bis-(4-phenyl isocyanate).

The paint was reduced to a hand spray viscosity as in Example 3 with xylol and sprayed onto a treated steel substrate and baked for 30 minutes at 95° C. The baked paint has excellent resistance to solvents, excellent adhesion to the metal substrate and is tough and flexible.

I claim:

1. A thermosetting coating composition comprising 5–60% by weight of a polymer blend and a solvent for the polymer blend in which the blend consists essentially of
   (I) an organic polyisocyanate; and
   (II) a polymer, wherein the polymer has a backbone of polymerized ethylenically unsaturated monomers and polymerized ethylenically unsaturated ester units that form ester groups pending from the carbon atoms of the polymer backbone and said ester groups comprise about 10 to 75% of the total weight of the polymer and consisting essentially of ester group (A)

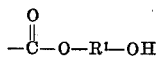

and ester group (B) selected from the group consisting of

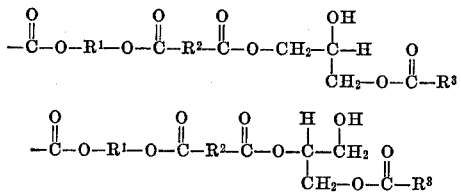

or mixtures thereof, wherein the molar ratio of ester group (A) to ester (B) is from about 1:1.5 to 1:2.5; and wherein
   $R^1$ is saturated hydrocarbon radical containing 2–10 carbon atoms;
   $R^2$ is selected from the group consisting of alkylene vinylene, aromatic, and carboxylic radicals, and
   $R^3$ is selected from the group consisting of a saturated aliphatic hydrocarbon radical having 1 to 26 carbon atoms and an ethylenically unsaturated aliphatic hydrocarbon radical having 12 to 18 carbon atoms.
said ethylenically unsaturated monomers being selected from the group consisting of vinyl chloride, vinylidene chloride, ethylene, propylene, vinyl acetate, conjugated dienes having 4 to 10 carbon atoms, styrene, aromatic hydrocarbon having a vinylidene group, alkyl maleate, vinyl pyrrolidone, acrylonitrile, alkyl methacrylate and alkyl acrylate wherein the alkyl groups have 1–12 carbon atoms, and mixtures thereof.

2. The coating composition of claim 1 containing pigment.

3. The coating composition of claim 1 in which the organic polyisocyanate is selected from the group consisting of an aliphatic diisocyanate, cycloaliphatic diisocyanate, alkaryl diisocyanate, aralkyl diisocyanate, heterocyclic diisocyanate and aryl diisocyanate, the molar ratio of isocyanate to hydroxyl is maintained between about 0.8:1 to about 1.2:1.

4. The coating composition of claim 1 in which the organic polyisocyanate is of the formula

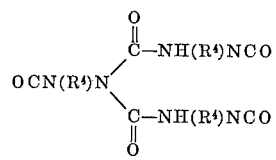

wherein $R^4$ is an aliphatic hydrocarbon radical having 1–12 carbon atoms.

5. The coating composition of claim 4 which contains about 0.01–1% by weight based on the weight of the polymer blend of a reaction catalyst.

6. The coating composition of claim 5 in which the reaction catalyst is an organo tin catalyst.

7. The coating composition of claim 4 in which the polymer has a backbone consisting essentially of polymerized monomers of an aromatic hydrocarbon having vinylene groups, and esters of an $\alpha,\beta$-ethylenically unsaturated carboxylic acid and in which
   $R^1$ is a saturated aliphatic hydrocarbon group having 2–4 carbon atoms,
   $R^2$ is selected from the group consisting of an aromatic radical and a carbocyclic radical, and
   $R^3$ is tertiary aliphatic hydrocarbon group of 8 through 10 carbon atoms, and
contain 0.01–1% by weight, based on the weight of the polymer blend of a reaction catalyst.

8. The coating composition of claim 7 in which the polymer backbone consists essentially of styrene and an acrylic ester selected from the group consisting of an alkyl methacrylate, an alkyl acrylate and mixtures thereof in which the alkyl group contains 1–12 carbon atoms; in which
   $R^1$ is a saturated hydrocarbon group having 2–4 carbon atoms,
   $R^2$ is an aromatic radical,
   $R^3$ is a tertiary hydrocarbon group having 8 through 10 carbon atoms, and
   $R^4$ is a saturated aliphatic hydrocarbon radical having 6 carbon atoms, and
contains 0.01–1% by weight, based on the weight of the polymer blend of an organo tin reaction catalyst.

9. The coating composition of claim 8 in which the ester groups comprise 30 to 60% by weight of the polymer and in which the acrylic ester is methyl methacrylate and in which $R^1$ is ethylene and $R^2$ is phenylene.

10. The coating composition of claim 1 in which the polymer has a backbone of acrylic esters consisting essentially of polymerized monomers selected from the group consisting of an alkyl methacrylate, an alkyl acrylate or a mixture thereof, in which the alkyl group contains 1–12 carbon atoms, and in which
    $R^1$ is a saturated aliphatic hydrocarbon group having 2–4 carbon atoms,
    $R^2$ is selected from the group consisting of an aromatic radical and a carbocyclic radical, and
    $R^3$ is tertiary aliphatic hydrocarbon group of 8 through 10 carbon atoms.

11. The coating composition of claim 10 in which the organic polyisocyanate is a biuret of the formula

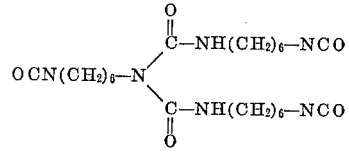

and contains 0.01–1% by weight, based on the weight of the polymer blend of an organo tin reaction catalyst.

12. The coating composition of claim 11 in which the backbone of the acrylic esters consists essentially of butyl methacrylate and $R^1$ is ethylene and $R^2$ is phenylene.

13. The coating composition of claim 11 in which the backbone of the acrylic esters consists essentially of methyl methacrylate and $R^1$ is ethylene and $R^2$ is phenylene.

14. The coating composition of claim 11 in which the backbone of the acrylic esters consists essentially of butyl methacrylate and $R^1$ is an ethylene group and $R^2$ is

References Cited

UNITED STATES PATENTS

| 3,433,771 | 3/1969 | Vasta | 260—77.5 |
| 3,367,992 | 2/1968 | Bearden | 260—837 |
| 3,457,324 | 7/1969 | Sekmakas | 260—834 |

FOREIGN PATENTS 783,209  9/1967  Italy.

OTHER REFERENCES

Shell Industrial Chemicals—Cardura E Ester—Technical Bulletin—July 1965, pp. 1–4.

Dombrom—Polymethanes, 2nd edition, Reinhold, New York (1965) p. 7.

DONALD E. CZAJA, Primary Examiner

H. S. COCKERAM, Assistant Examiner

U.S. Cl. X.R.

117—124, 128.4, 138.8, 148, 161; 260—18, 29.1, 31.2, 32.8, 33.2, 33.4, 33.6, 33.8, 37, 858, 859